(12) United States Patent
Weir

(10) Patent No.: US 6,613,452 B2
(45) Date of Patent: Sep. 2, 2003

(54) CORROSION RESISTANT COATING SYSTEM AND METHOD

(75) Inventor: John Douglas Weir, Huntington, NY (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/761,220

(22) Filed: Jan. 16, 2001

(65) Prior Publication Data

US 2002/0092586 A1 Jul. 18, 2002

(51) Int. Cl.[7] .......................... B32B 15/01; B32B 31/00
(52) U.S. Cl. ....................... 428/652; 148/527; 148/530; 148/531; 427/383.1; 427/405; 428/655; 428/656; 428/680; 428/686; 428/610; 428/933; 428/936; 428/938
(58) Field of Search ................................. 428/652, 655, 428/680, 686, 610, 933, 936, 938, 656; 148/527, 530, 531; 427/383.1, 405

(56) References Cited

U.S. PATENT DOCUMENTS

| | | | |
|---|---|---|---|
| 3,254,970 A | 6/1966 | Dittrich et al. | |
| 3,322,515 A | 5/1967 | Dittrich et al. | |
| 3,655,425 A | 4/1972 | Longo et al. | |
| 3,762,884 A | 10/1973 | Grisaffe et al. | |
| 3,837,894 A | 9/1974 | Tucker, Jr. | |
| 3,841,901 A | 10/1974 | Novinski et al. | |
| 3,859,061 A | 1/1975 | Speirs et al. | |
| 3,887,731 A | 6/1975 | Dean et al. | |
| 3,897,222 A | * 7/1975 | Hood | 428/652 |
| 4,019,875 A | 4/1977 | Dittrich et al. | |
| 4,173,685 A | 11/1979 | Weatherly | |
| 4,358,922 A | 11/1982 | Feldstein | |
| 4,358,923 A | 11/1982 | Feldstein | |
| 4,612,236 A | 9/1986 | Hsu et al. | |
| 4,645,895 A | 2/1987 | Boxman et al. | |
| 4,699,839 A | 10/1987 | Hornberger | |
| 4,761,346 A | 8/1988 | Naik | |
| 4,765,871 A | 8/1988 | Hsu et al. | |
| 5,049,418 A | 9/1991 | Tobin | |
| 5,196,075 A | 3/1993 | Jansen et al. | |
| 5,236,788 A | * 8/1993 | Manier et al. | 428/652 |
| 5,270,081 A | 12/1993 | Manier et al. | |
| 5,587,006 A | 12/1996 | Shepherd et al. | |
| 5,660,886 A | 8/1997 | Peterman et al. | |
| 5,733,667 A | 3/1998 | Nakasuji et al. | |
| 5,925,231 A | 7/1999 | Metzger | |

OTHER PUBLICATIONS

"Electrodeposition: The Materials Science of Coatings and Substrates"; Jack W. Dini; Noyes Publications, Westwood, New Jersey; 1993; pp. 306–308, No month.*

"Standard Test Method for Mechanical Hydrogen Embrittlement Evaluation of Plating Processes and Service Environments;" American Society For Testing & Materials; pp 1–11, F519–97, Aug. 1997.

(List continued on next page.)

Primary Examiner—Robert R. Koehler
(74) Attorney, Agent, or Firm—Baker Botts L.L.P.

(57) ABSTRACT

A system and method for producing a corrosion-resistant article includes a metal substrate and a multi-layer resistant coating disposed over the metal substrate. The coating is operable to resist corrosion and hydrogen embrittlement of the metal substrate. The coating includes a first layer comprising a material galvanically similar to the metal substrate. The coating also includes a second layer disposed over the first layer. The second layer comprises a metal anodic to the metal substrate. The corrosion resistant article may also include a corrosion resistant interface layer at the boundary of the first and second layers. The interface layer may be formed by diffusing a portion of the second layer into the first layer.

30 Claims, 1 Drawing Sheet

OTHER PUBLICATIONS

"*Military Specification Coatings, Electroless Nickel, Requirements For,*" Information Handling Services, DOD-STD Issue DW0001; pp 1–10, MIL–C–26074E(SH), Feb. 25, 1998.

"*Military Standard Cadmium–Titanium Plating, Low Embrittlement, Electrodeposition;*" Information Handling Services, DODSTD Issue DW0001; pp 1–10, MIL–STD–1500B(USAF), Dec. 9, 1996.

Aerospace Material Specification "*Coating, Cadmium (Vacuum Deposited);*" SAE International; pp 1–13, AMS–C–8837, Jun. 1999.

Federal Specification "*Plating, Cadmium (Electrodeposted);*" Information Handling Services, DODSTD Issue DW9804; pp 1–17, QQ–P–416F, May 30, 1995.

Aerospace Material Specification "*Heat Treatment of Steel Raw Materials;*" SAE International; pp 1–29, AMS–H–6875A, Dec. 1998.

"*Corrosion Performance of Environmentally Acceptable Alternatives to Cadmium and Chromium Coatings Chromium—Part II,*" Concurrent—Technologies Corp., Johnstown, PA, pp. 39–43, Aug. 2000.

"*AlumiPlate Plating With Aluminum,*" Our Commitment to a Safer Environment, pp. 1–6; http://www.alumiplate.com/html/body_environment.html, Jan. 15, 2000.

* cited by examiner

CORROSION RESISTANT COATING SYSTEM AND METHOD

TECHNICAL FIELD OF INVENTION

This invention relates in general to the field of protective coatings and, more particularly, to a corrosion resistant coating system and method.

BACKGROUND OF THE INVENTION

Cadmium plate and coatings containing cadmium are generally used to protect steel, ferrous, non-ferrous, and other materials or assemblies from corrosion. For example, because cadmium is anodic to steel or iron, the ferrous material is protected at the substrate level even if the substrate becomes nicked or scratched. Cadmium is generally applied as a thin coating on the order of one mil or less to components such as fasteners, fittings, plates or other types of components. For example, cadmium plating or a coating containing cadmium is often applied to threaded fasteners, such as bolts, to reduce the galvanic effects between the fastener and assembled components that are constructed from dissimilar materials. Thus, for example, in assembling aluminum components using steel fasteners, cadmium plating may be applied to the steel fasteners to reduce the galvanic effects between the steel fasteners and the assembled aluminum components.

Cadmium plating and/or coatings containing cadmium are also used to protect components from the effects of corrosion and corrosion related cracks and hydrogen embrittlement. For example, environmental exposure of steel components may result in hydrogen absorption by the steel components, thereby causing hydrogen stress cracks. Thus, the cadmium plating substantially prevents hydrogen absorption by the component, thereby minimizing the likelihood of hydrogen stress cracks.

Cadmium plate and coatings containing cadmium, however, suffer several disadvantages. For example, acute toxicity is a hazard associated with the use of cadmium in plating and/or coating operations. For example, poisoning may result from the ingestion of cadmium dissolved from containers. Additionally, inhalation of dust or fumes of cadmium salts and cadmium oxide may result when cadmium plated parts are heated. Cadmium is also associated with being a human carcinogen, a teratogen, and may cause reproductive damage in humans and animals. Cadmium also may be released into the environment as a result of leaching of landfills or from waste streams associated with industrial applications. Because cadmium is subject to EPA regulations, the costs and liabilities associated with cadmium use is generally prohibitive.

SUMMARY OF THE INVENTION

The present invention provides a corrosion resistant coating system and method that addresses shortcomings of prior coatings and methods. In particular, a multi-layer coating is provided that substantially reduces corrosion and hydrogen embrittlement of substrate materials as an alternative and/or substitute for cadmium.

According to one embodiment of the present invention, a method for producing a corrosion-resistant article includes providing a substrate and applying a multi-layer corrosion resistant coating to the substrate. Applying the multi-layer corrosion resistant coating includes applying a first layer to the substrate and applying a second layer over the first layer. The first layer includes a metal substantially galvanically similar to the substrate. The second layer includes a metal substantially anodic to the substrate.

According to another embodiment of the present invention, a corrosion resistant article includes a substrate and a multi-layer resistant coating disposed over the substrate. The coating is operable to resist corrosion and hydrogen embrittlement of the substrate. The multi-layer resistant coating includes a first layer comprising a metal or alloy of metals galvanically similar to the substrate. The multi-layer resistant coating also includes a second layer disposed over the first layer. The second layer includes a metal or alloy of metals anodic to the substrate. The coating also includes a corrosion-resistant interface layer disposed at the boundary of the first and second layers. The interface layer may be formed by diffusing a portion of first or second layer into a portion of the opposite layer.

Technical advantages of the present invention include providing an improved corrosion and hydrogen embrittlement resistant coating for metal substrates. In particular, a first layer galvanically similar to the substrate protects the substrate from the effects of corrosion and hydrogen embrittlement. A second layer selected from a group of elements anodic to the substrate is applied over the first layer to provide a coating that is similar on the galvanic series for dissimilar metal protection.

Other technical advantages of the present invention will be readily apparent to one skilled in the art from the following figures, descriptions and claims.

BRIEF DESCRIPTION OF THE DRAWINGS

For a more complete understanding of the present invention, and the advantages thereof, reference is now made to the following descriptions taken in connection with the accompanying drawings in which.

DETAILED DESCRIPTION OF THE INVENTION

Figure 1:
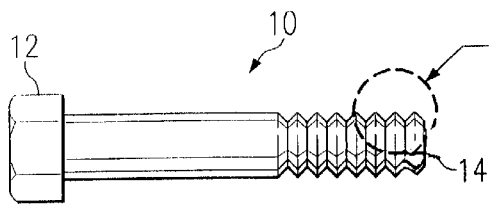
FIG. 1 is a diagram illustrating a corrosion resistant article in accordance with an embodiment of the present invention.

FIG. 1 is a diagram illustrating a corrosion resistant article 10 in accordance with an embodiment of the present invention. As illustrated in FIG. 1, article 10 may comprise a fastener 12 constructed from a metal substrate 14. The substrate 14 may include steel or ferrous or non-ferrous alloy materials, or other suitable materials requiring corrosion protection and/or dissimilar metal protection. Additionally, it should be understood that the present invention may be applied to other suitable components, such as fittings, plates, housings, fastener components, and other components requiring corrosion resistance.

Figure 2A:
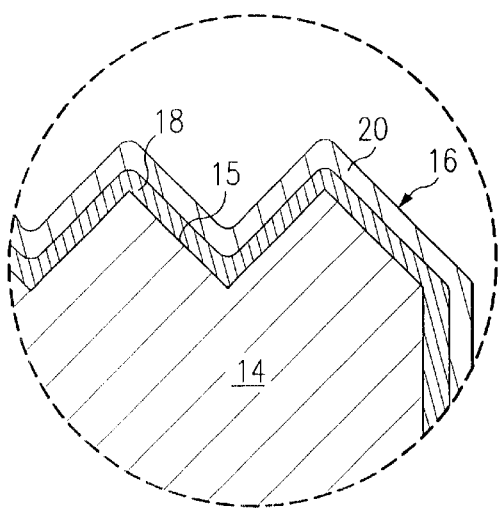
FIG. 2A is a diagram illustrating a close-up view of a multi-layer corrosion resistant coating of the corrosion resistant article illustrated in FIG. 1 in accordance with an embodiment of the present invention.

FIG. 2A is a diagram illustrating a close-up view of a portion of article 10 in accordance with an embodiment of the present invention. Article 10 comprises a multi-layer corrosion resistant coating 16 applied over an exterior surface 15 of article 10. Coating 16 comprises a layer 18 applied to exterior surface 15 of substrate 14, and a layer 20 disposed over layer 18. Layers 18 and 20 may be applied to article 10 using plating, plasma spray, flame plating, thermal spray, arc wire spraying, ion vapor deposition, high velocity oxygen flame (HVOF), sputtering, vapor deposition, mechanical deposition, electroless deposition, and laser deposition techniques; however, other suitable application techniques may be used for applying layers 18 and 20 to article 10.

Additionally, it should be understood that coating 16 may be applied to all or a portion of article 10 to accommodate various corrosion resistant requirements. For example, portions of article 10 may be in contact with other components constructed from dissimilar materials which may result in galvanic corrosion. Coating 16 may be applied to portions of article 10 as required to prevent galvanic corrosion from the dissimilar material contact.

Layer 18 comprises a metal selected from the group of elements galvanically similar or slightly cathodic to substrate 14, including, but not limited to, noble elements such as nickel, cobalt, copper, chrome, gold, niobium, silver, platinum, titanium, tantalum, and tungsten. However, it should be understood that other suitable materials or alloys galvanically similar or slightly cathodic to substrate 14 may be used for layer 18. Selecting materials galvanically similar to, or slightly cathodic to, substrate 14 for layer 18 provides protection from hydrogen embrittlement of substrate 14. For example, the threshold for hydrogen stress cracking is related to the electrochemical potential difference between substrate 14 and any coating over the substrate 14, as well as other factors related to coating integrity, such as corrosion resistance. The application of layer 18 of a metal compound galvanically similar or slightly cathodic to substrate 14 therefore prevents hydrogen from being absorbed directly onto the surface of substrate 14, thereby substantially preventing hydrogen stress cracking of article 10.

Additionally, selecting layer 18 from materials galvanically similar to substrate 14 provides increased corrosion protection of article 10. For example, providing layer 18 having material properties galvanically similar to steel substrate 14 substantially prevents galvanic corrosion between layer 18 and substrate 14, thereby substantially preventing corrosion, pitting, and other corrosive related defects from affecting substrate 14. Layer 18 may generally be applied to a thickness of approximately 0.0010–0.0015 inches; however, other suitable thicknesses of layer 18 may be used.

Layer 20 comprises a coating selected from the group of elements generally anodic to substrate 14 and/or layer 18 to provide corrosion and dissimilar metal protection for article 10. For example, because layer 18 is generally galvanically similar or slightly cathodic to substrate 14, galvanic attack to layer 18 may result depending on the corrosive media existing in the environment surrounding article 10. Applying an anodic layer 20 to substrate 14 and layer 18 provides corrosion protection of substrate 14 while also providing a coating that is similar on the galvanic series to structure that may be in contact with article 10. For example, anodic materials for layer 20 may include aluminum, zinc, magnesium, indium, beryllium, uranium, tin, lead, or other suitable materials generally anodic to substrate 14. Layer 20 may also be applied to a thickness of approximately 0.0010–0.0015 inches; however, other suitable thicknesses of layer 20 may also be used.

Figure 2B:
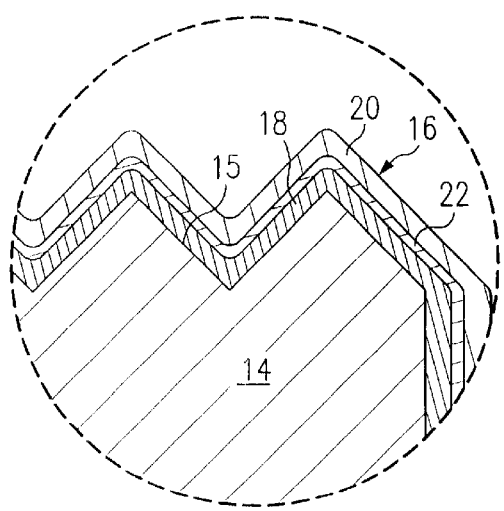
FIG. 2B is a diagram illustrating a close-up view of a multi-layer corrosion resistant coating of the corrosion resistant article illustrated in FIG. 1 in accordance with an alternative embodiment of the present invention.

FIG. 2B is a diagram illustrating a close-up view of a portion of article 10 in accordance with an alternative embodiment of the present invention. In this embodiment, layer 18 is applied over substrate 14 and layer 20 is applied over layer 18. A corrosion resistant interface layer 22 is formed at the boundary of layers 18 and 20 to provide additional corrosion protection to article 10.

Interface layer 22 is formed by diffusing a portion of layer 20 into layer 18. Diffusing a portion of layer 20 into layer 18 generally forms another compound at the interface or boundary of layers 18 and 20 resulting from an exothermic reaction at the interface of layers 18 and 20. For example, layer 18 may be formed using nickel, and layer 20 may be formed using aluminum. Diffusing a portion of layer 20 into layer 18 generally forms compounds of nickel aluminide at the interface of layers 18 and 20, thereby forming an additional corrosion protective interface layer 22. Interface layer 22 provides a galvanic protective barrier while preventing corrosion and embrittlement. Thus, interface layer 22 provides additional corrosion protection of article 10.

For example, if aluminum is selected as the material comprising layer 20, materials for layer 18 may be selected to react with the aluminum layer 20 to form aluminides as the interface layer 22, such as, but not limited to, $Ni_xAl_y$, $Co_xAl_y$, $Nb_xAl_y$, $Pt_xAl_y$, $Ta_xAl_y$, $Cr_xAl_y$, and $Fe_xAl_y$, where x and y represent the molecular composition of the aluminide. Additional examples of materials that may be selected for layer 18 with aluminum selected for layer 20 to form an aluminide as the interface layer 22 are listed below.

Ni+AL
Cr+AL
Co+AL
Monel+AL
Bronze+AL
Brass+AL
Metco 15 Alloy+AL
Stainless+AL
Tungsten+AL
Silver+AL
Ni Boron+AL
Cr Baron+AL
Cr Boron+Cr Boride+AL
Ni Phosphorus+AL
Copper+Nickel+AL
WC (Tungsten Carbide)+AL
(WC—Co)+AL
(WC—Co—Cr)+AL
(Ni—Cr—Mo)+AL
(Ni—Cr—SiB)+AL
(Fe—Cr—Mo)+AL
(Fe—Cr—Ni)+AL
($Cr_3C_2$/Ni—Cr)+AL
(Co—Mo—Cr—Si)+AL
(Ni—W—Cr—Si—B)+AL
(WC—Co—Cr)+AL
(WC—Co/Ni—Cr—Mo)+AL
(Ni—W—B)+AL
(Ni—W—Si)+AL
(WC—Co—Cr—Ni)+AL However, it should be understood that other suitable materials besides aluminum may be selected as layer 20 for reacting with layer 18 to form an interface,layer 22.

Diffusing a portion of layer 20 into layer 18 may be performed by heating article 10 after application of layers 18 and 20 while subjecting article 10 to a non-oxidizing atmosphere. For example, after application of layers 18 and 20, article 10 may be disposed within a vacuum chamber (not explicitly shown), or a chamber containing high temperature Argon or other inert gas, or other suitable atmosphere to provide a non-oxidizing environment. For example, heating article 10 may cause oxidization of layer 20, which in turn may retard the diffusion process. Therefore, disposing article 10 in a non-oxidizing environment during the diffusion process substantially prevents oxidization of layer 20 and enhances the diffusion of a portion of layer 20 into layer 18.

After disposing article 10 in the non-oxidizing environment, article 10 may be heated to a predetermined temperature for a predetermined period of time to cause a portion of layer 20 to diffuse into layer 18. The predetermined temperature and predetermined time period may vary to accommodate various thicknesses of interface layer 22. For example, article 10 may be heated to a predetermined temperature of approximately 900° to 1000° Fahrenheit for a predetermined time period of approximately four hours to cause formation of interface layer 22. However, other suitable predetermined temperatures and time periods may be used to accommodate various interface layer 22 thicknesses and properties. The predetermined temperature used to form interface layer 22 should also be selected generally equal to or below a tempering temperature or aging temperature of substrate 14 to substantially prevent degradation of the structural properties of article 10.

Figure 3:
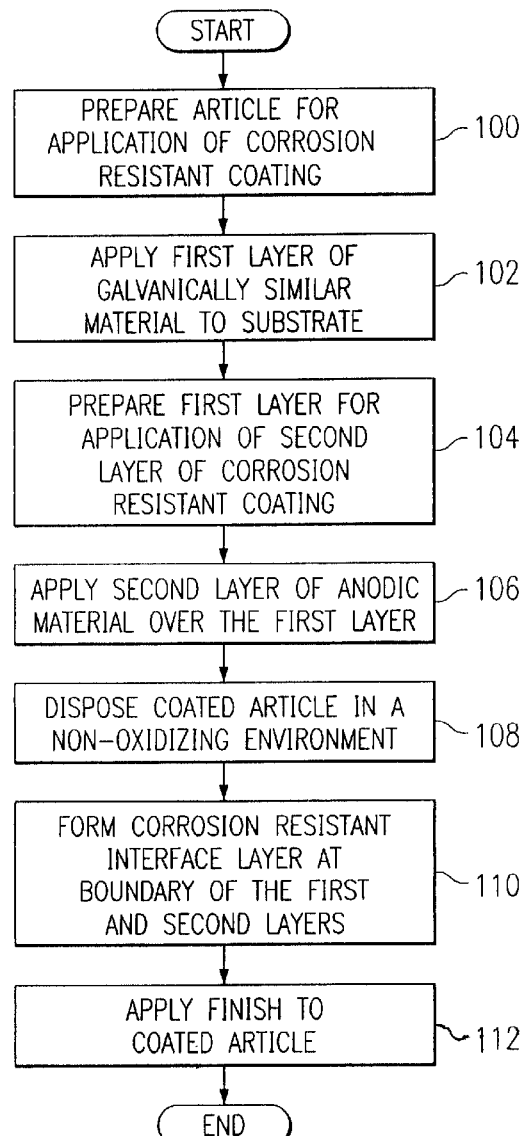
FIG. 3 is a flowchart illustrating a method for producing a multi-layer corrosion resistant coating on a ferrous alloy article in accordance with an embodiment of the present invention.

FIG. 3 is a flowchart illustrating a method for forming a corrosion resistant article 10 in accordance with an embodiment of the present invention. The method begins at step 100 where article 10 is prepared for subsequent application of corrosion resistant coating 16. For example, the surface of article 10 may be prepared and/or cleaned in preparation for receiving layer 18 of corrosion resistant coating 16. Article 10 may be alkaline cleaned, acid cleaned, and/or abrasive blasted to remove scale, dirt and/or other surface residue that may impede adhesion of layer 18 to substrate 14 of article 10. However, other suitable surface preparations or methods may be used for preparing exterior surface 15 of substrate 14 for application of layer 18.

At step 102, layer 18 is applied to all or a portion of article 10. As described above, layer 18 may be applied using plating, plasma spray, flame plating, thermal spray, arc wire spraying, ion vapor deposition, mechanical deposition, electroless deposition, laser deposition, electrolytic plating or other suitable application techniques. As described above, layer 18 comprises a metal selected from a group of elements that is galvanically similar or slightly cathodic to substrate 14 to substantially reduce or eliminate galvanic corrosion between substrate 14 and layer 18. For example, layer 18 may comprise nickel, cobalt, chrome or other suitable metals or metal alloys galvanically similar or slightly cathodic to substrate 14.

At step 104, layer 18 is prepared for subsequent application of layer 20 over layer 18. For example, article 10 and layer 18 may be cleaned and/or abraded, such as by vapor de-greasing or solvent cleaning, to remove scale, dirt and/or other materials that may inhibit or impede adhesion of layer 20 to layer 18.

At step 106, layer 20 is applied over layer 18. Layer 20 may be applied using plating, plasma spray, flame plating, arc wire spraying, ion vapor deposition, mechanical deposition, laser deposition, or other suitable techniques. As described above, layer 20 comprises a metal selected from the group of elements generally anodic to substrate 14 and/or layer 18 to substantially prevent corrosion of article 10 caused by dissimilar metals in contact with or in close proximity to article 10. For example, layer 20 may comprise zinc or aluminum; however, other suitable materials generally anodic to article 10 may be used for layer 20.

At step 108, article 10 is placed in a non-oxidizing atmosphere to enhance subsequent diffusion of a portion of layer 20 into layer 18 and the formation of interface layer 22. For example, the non-oxidizing environment may include a vacuum chamber or other type of chamber and may contain argon or other inert gases to prevent oxidization of layer 20 which may retard or impede diffusion of layer 20 into layer 18. At step 110, heat is applied to article 10 to form interface layer 22. As described above, heating article 10 causes an exothermic reaction at the boundary of layers 18 and 20 to form compounds comprising the materials of layers 18 and 20 to form interface layer 22. Additionally, the predetermined temperature used to form interface layer 22 should generally be equal to or below a tempering or aging temperature of substrate 14 to substantially prevent degradation of the structural properties of article 10. For example, the predetermined temperature may be selected at approximately 50° Fahrenheit below the tempering or aging temperature of substrate 14; however, other suitable limiting temperatures may be used below the tempering temperature of substrate 14 to substantially prevent degradation of the structural properties of article 10.

At step 112, article 10 may be cooled to room temperature and a finish applied to article 10 to accommodate storage of article 10 or further corrosion protection of article 10. For example, an Alodine or chemical film treatment may be applied to article 10 to provide additional corrosion protection and/or paint adhesion. However, other suitable methods or materials may be applied to article 10 to further enhance corrosion protection. Additionally, the finish applied at step 112 may be used as a lubricant, such as in fastener applications for article 10, to substantially lower torque friction to obtain increased clamping of adjacent structure.

Thus, the present invention provides greater flexibility than prior corrosion resistant coatings by alleviating environmental and health hazards associated with cadmium use. Additionally, the present invention provides increased corrosion resistance while substantially preventing hydrogen embrittlement of article 10.

Although the present invention has been described in detail, various changes and modifications may be suggested to one skilled in the art. It is intended that the present invention encompass such changes and modifications as falling within the scope of the appended claims.

What is claimed is:

1. A method for producing a corrosion-resistant article, comprising:
    providing a metal substrate for use in a particular environment; and
    applying a multi-layer corrosion resistant coating to the substrate, wherein applying the multi-layer corrosion resistant coating comprises:
        applying a first layer to the substrate, the first layer comprised at least fifty percent by weight of a metal galvanically similar to the substrate in the particular environment; and
        applying a second layer over the first layer, the second layer comprising a metal anodic to the substrate in the particular environment and selected from the group consisting of zinc, magnesium, indium, beryllium, uranium, tin and lead.

2. The method of claim 1, and further comprising diffusing a portion of the second layer into the first layer to form an interface layer.

3. The method of claim 2, wherein the substrate comprises a tempering temperature, and wherein diffusing comprises heating the first and second layers to a temperature equal to or less than the tempering temperature.

4. The method of claim 1, further comprising:
    depositing the substrate in a non-oxidizing environment after application of the first and second layers; and heating the substrate in the non-oxidizing environment to diffuse a portion of the second layer into the first layer to form a corrosion resistant interface layer at the boundary of the first and second layers.

5. The method of claim 4, wherein heating comprises heating the substrate for a period of approximately four hours at a temperature of approximately 900 degrees Fahrenheit.

6. The method of claim 1, wherein the second layer consists essentially of zinc.

7. The method of claim 1, wherein the second layer consists essentially of magnesium.

8. The method of claim 1, wherein the second layer comprises indium.

9. The method of claim 1, wherein the second layer comprises beryllium.

10. The method of claim 1, wherein the second layer comprises uranium.

11. The method of claim 1, wherein the second layer comprises tin.

12. The method of claim 1, wherein the second layer comprises lead.

13. The method of claim 1, wherein applying the second layer comprises applying the second layer over the first layer by ion vapor deposition.

14. A method for producing a corrosion-resistant article, comprising:
    providing a metal substrate for use in a particular environment; and
    applying a multi-layer corrosion resistant coating to the substrate, wherein applying the multi-layer corrosion resistant coating comprises:
        applying the first layer to the substrate by electroless deposition, the first layer comprising a metal galvanically similar to the substrate in the particular environment; and
        applying a second layer over the first layer by ion vapor deposition, the second layer comprising a metal anodic to the substrate in the particular environment.

15. The method of claim 14, wherein applying the first layer comprises applying a nickel layer to the substrate, and wherein applying the second layer comprises applying an aluminum layer over the nickel layer.

16. The method of claim 14, and further comprising diffusing a portion of the second layer into the first layer to form an interface layer.

17. The method of claim 16, wherein applying the first layer comprises applying a nickel layer to the substrate, and wherein applying the second layer comprises applying an aluminum layer over the nickel layer.

18. The method of claim 17, wherein diffusing comprises diffusing a portion of the aluminum layer into the nickel layer to form a nickel aluminide interface layer.

19. The method of claim 16, wherein diffusing comprises:
    disposing the metal substrate in a non-oxidizing environment after applying the first and second layers; and
    heating the metal substrate in the non-oxidizing environment to a predetermined temperature to cause a portion of the second layer to diffuse into the first layer.

20. The method of claim 19, wherein heating comprises heating the metal substrate to the predetermined temperature, the predetermined temperature less than or equal to an aging temperature of the metal substrate.

21. The method of claim 19, wherein the non-oxidizing environment comprises a vacuum chamber, and wherein heating the metal substrate comprises heating the metal substrate in the vacuum chamber under vacuum pressure.

22. The method of claim 16, wherein diffusing comprises:
    disposing the metal substrate in a vacuum chamber after applying the first and second layers;
    applying a vacuum pressure to the metal substrate using the vacuum chamber; and
    heating the metal substrate to approximately 900 degrees Fahrenheit for a period of approximately four hours to cause a portion of the second layer to diffuse into the first layer.

23. A corrosion-resistant ferrous article, comprising:
    a ferrous substrate for use in a particular environment; and
    a multi-layer resistant coating disposed over the ferrous substrate, the coating providing resistance against corrosion and hydrogen embrittlement of the ferrous substrate, wherein the coating comprises:
        a first layer comprising a material galvanically similar to the ferrous substrate in the particular environment; and
        a second layer disposed over the first layer, the second layer comprised at least fifty percent by weight of a metal anodic to the ferrous substrate in the particular environment and selected from the group consisting of zinc, magnesium, indium, beryllium, uranium, tin and lead.

24. The article of claim 23, further comprising a corrosion resistant interface layer disposed at a boundary of the first and second layers, the interface layer formed by diffusing a portion of the second layer into the first layer.

25. The article of claim 23, wherein the first layer is formed on a surface of the ferrous article by electroless deposition.

26. The article of claim 23, wherein the second layer is disposed over the first layer by ion vapor deposition.

27. A method for producing a corrosion-resistant article, comprising:
    providing a metal substrate for use in a particular environment; and
    applying a multi-layer corrosion resistant coating to the substrate, wherein applying the multi-layer corrosion resistant coating comprises:
        applying the first layer to the substrate by electroless deposition, the first layer comprising a metal galvanically similar to the substrate in the particular environment; and
        applying a second layer over the first layer by an application process selected from the group consisting of plasma spraying, flame plating, thermal spraying, arc wire spraying, high velocity oxygen flame, sputtering, vapor deposition, and mechanical deposition, the second layer comprising a metal anodic to the substrate in the particular environment.

28. The method of claim 27, wherein applying the first layer comprises applying a nickel layer to the substrate, and wherein applying the second layer comprises applying an aluminum layer over the nickel layer.

29. The method of claim 27, and further comprising diffusing a portion of the second layer into the first layer to form an interface layer.

30. The method of claim 29, wherein applying the first layer comprises applying a nickel layer to the substrate, and wherein applying the second layer comprises applying an aluminum layer over the nickel layer.

* * * * *